(12) United States Patent
Liao

(10) Patent No.: US 7,782,552 B2
(45) Date of Patent: Aug. 24, 2010

(54) COMPACT IMAGING LENS SYSTEM

(75) Inventor: Chen-cheng Liao, Taipei (TW)

(73) Assignee: Asia Optical Co., Inc, Taichung (TW)

(*) Notice: Subject to any disclaimer, the term of this patent is extended or adjusted under 35 U.S.C. 154(b) by 99 days.

(21) Appl. No.: 12/046,775

(22) Filed: Mar. 12, 2008

(65) Prior Publication Data
US 2008/0225401 A1   Sep. 18, 2008

(30) Foreign Application Priority Data
Mar. 13, 2007   (TW) .............................. 96108598 A

(51) Int. Cl.
*G02B 15/14* (2006.01)
(52) U.S. Cl. ...................... 359/784; 359/785
(58) Field of Classification Search .................. 359/784, 359/789
See application file for complete search history.

(56) References Cited

U.S. PATENT DOCUMENTS 7,184,225 B1* 2/2007 Noda .......................... 359/784
7,307,799 B2* 12/2007 Minefuji ...................... 359/738
2005/0275950 A1* 12/2005 Kubota et al. ............... 359/689
2007/0070526 A1* 3/2007 Sato ............................ 359/784

* cited by examiner

*Primary Examiner*—Joseph Martinez
*Assistant Examiner*—James R Greece

(57) ABSTRACT

A compact imaging lens system includes three lenses. The first lens is a positive meniscus lens having a convex side facing toward the image side, which has a big focusing power and is provided to capture image and for balance of aberration. The first lens serves to make the lens system a low sensitivity lens system. The second lens is a negative lens and is provided mainly for correcting chromatic aberration and off-axis aberration. An aperture is set between the first and second lenses, and this is of benefit to balance of aberration. The third lens is a negative lens and is provided for correcting off axis aberration. All the lenses can be made of plastics. This facilitates cost reduction, weight reduction, while still maintains a high resolution.

9 Claims, 4 Drawing Sheets

COMPACT IMAGING LENS SYSTEM

BACKGROUND OF THE INVENTION

1. Field of the Invention

The present invention relates to a lens system, and particularly relates to a low-cost, small-size and yet high-performance imaging lens system suitable for use in a portable device.

2. Description of Prior Art

As electronic techniques develop constantly, portable electrical devices, such as mobile phones, notebooks and personal digital assistants (PDAs), are commonly integrated with optical techniques. A typical sample is that a mobile phone is combined with a zoom lens to realize imaging function. However, the portable imaging devices generally require its lens system to be not only maintaining a high level of optical performance but also low cost and compact, due to the limited space of the portable imaging devices.

As an image pick-up device, the conventional spherical glass lenses have been widely adopted in optical technology because there is a wide range of materials available for making such lenses and the color aberration thereof can be more easily corrected. However, the spherical glass lenses have the disadvantages of uneasy correction of spherical aberration and astigmatic aberration when they are used in applications requiring a small F number and a large wide angle of field. On the other hand, the spherical glass lens will be disbennifit in reducing the dimensions and the cost of the image pick-up device. To improve the above-mentioned drawbacks existing in the conventional spherical glass lenses, aspheric plastic lenses or aspheric molded glass lenses have been used to obtain better image quality and smaller dimension and lower cost.

The material of the lens generally includes glass and plastic. A glass lens has better transparent capability than that of a plastic lens, but the cost and weight of the glass lens is inferior to the plastic lens. Thus, currently, most imaging lens systems for compact imaging devices, such as camera phones, generally consist of a combination of both plastic lens and glass lens to provide high level optical performance and low cost and weight. In the current marker, most imaging lens systems are composed of one glass lens element and two plastic lens elements, or one glass lens element and three plastic lens elements for compact lens systems.

U.S. Pat. No. 6,441,971, entitled "Compact Lens with External Aperture Stop", discloses an imaging lens system composed of one glass lens element and two plastic lens elements. Specifically, the imaging lens system of the '971 patent includes, from the object side thereof, an aperture stop, a distal meniscus lens element made of glass, and first and second aspheric lens elements made of plastic. The meniscus lens element has a convex surface facing the object side, and is adapted to reduce lens temperature sensitivity and provide most of the focusing power while the first and second aspheric lens elements mainly provide aberration compensation. However, the lens system disclosed in the '971 patent is only suitable for an imaging pick-up device with a resolution under 640*480 pixels, it does not satisfy the requirement of higher resolution. Although the conventional lens system composed of one glass lens element and three plastic lens elements can satisfy the requirement of high resolution, the cost and the weight still are very high. Accordingly, in order to satisfy low cost and portability but having a high resolution desired by the market, further improvements on such an imaging lens system are needed.

SUMMARY OF THE INVENTION

Accordingly, one object of the present invention is to provide a compact imaging lens system that can be easily manufactured at a low cost and with low tolerance sensitivity, short length while offering a high level of optical performance.

To achieve the above object of the present invention, a compact imaging lens system in accordance with the present invention includes, from an object side to an image side, a first positive lens element, an aperture, a second negative lens element, and a third negative lens element. The first, second, and third lens elements are aspheric lenses each having at least one aspheric surface. The third lens element has a near-axis area and an edge portion extending from the near-axis area in a direction away from an optic axis of the lens system, and the third lens element has a focus that is of a negative value in the near-axis area and gradually increases from the negative value toward a positive value at the edge portion. The compact imaging lens system of the present invention satisfies the condition: $0.2 < f1/F < 1.2$, where f1 represents focal length of the first lens element and F represents an effective focal length of the lens system.

In a preferred embodiment of the present invention, the compact imaging lens system also satisfies the condition: $|R5-R4|/F < 0.3$, where R4 represents the radius of curvature of an object-side surface of the second lens element, R5 represents the radius of curvature of an image-side surface of the second lens element, and F is effective focal length of the lens system.

The lenses of the system can be all plastic lenses, and both surfaces of each lens can be aspheric surface.

In a preferred embodiment of the present invention, the first lens element is a positive meniscus having a first convex surface facing the object side and a second concave surface on the image side. The second lens element is a negative lens with a first concave surface facing the object side and a second convex surface on the image side.

According to the present invention, an image pickup device is further set on a position where an image is focused by the lens system. The image pickup device has a cover serving to protect an image pickup surface of the image pickup device.

The present compact imaging lens system adopts three lens elements. The first lens element is a positive meniscus lens having a convex side facing toward the image side, which has a big focusing power and is provided to capture image and balance of aberration. The first lens element makes the lens system a low sensitivity lens system. The second lens element is a negative lens and is provided mainly for correcting chromatic aberration and off-axis aberration. The aperture is set between the first and second lens elements, and this is of benefit to balance of aberration. The third lens element is a negative lens and is provided for correcting off axis aberration. Furthermore, the present imaging lens system consists of only three constituent lenses that are made of plastics. This facilitates cost reduction, weight reduction, while still maintains a high resolution.

BRIEF DESCRIPTION OF THE DRAWINGS

The present invention may best be understood through the following description with reference to the accompanying drawings, in which.

DETAILED DESCRIPTION OF THE PREFERRED EMBODIMENTS

Figure 1:
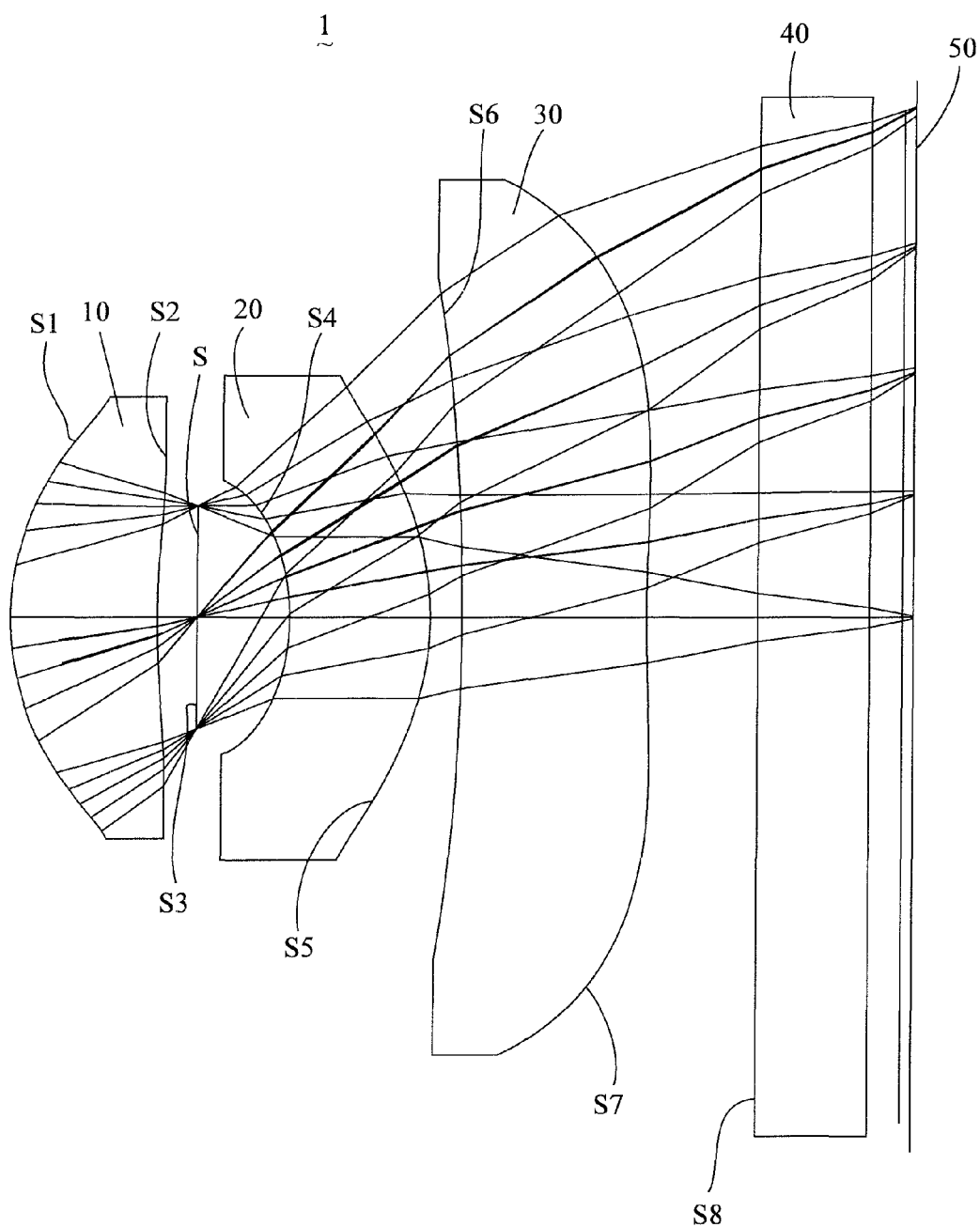
FIG. 1 schematically illustrates a compact imaging lens system in accordance with the present invention.

With reference to the drawings and in particular to FIG. 1, a compact imaging lens system in accordance with the present invention includes, from an object side to an image side, a first lens element 10, an aperture S, a second lens element 20, a third lens element 30, a cover glass 40 and an image panel 50. The incident light from the object to be imaged transmits, in sequence, through the first lens element 10, the aperture S, the second lens element 20, the third lens element 30, and the cover glass 40, and is then focused onto the image panel 50. For convenience of illustration, in FIG. 1, the image is focused onto the image panel 50, actually, on the position the image panel 50 lies, and there is an image pickup device (not shown) such as a CCD (Charge-Coupled Device) sensor or CMOS (Complimentary Metal-Oxide Semiconductor) sensor set to obtain the image, and the cover glass 40 can be a cover of the image pickup device for protecting an image pickup surface of the image pickup device.

The first lens element 1 is in the form of a positive meniscus lens having a first convex surface S1 facing the object side and an opposite second concave surface S2 on the image side. At least one of the surfaces S1, S2 is made aspheric. The first lens element has a big focusing power and is provided mainly to capture the image and for balance of aberration of the optic system. It makes the lens system less sensitive to manufacturing tolerance.

The aperture S, which is considered herein having a surface S3, is defined between the first lens element 10 and the second lens element 20 for taking both the exit pupil and the symmetry of the optical system into consideration so as to be of benefit to balance of aberration.

The second lens element 20 is a negative lens having a first concave surface S4 facing the object side and an opposite second convex surface S5 on the image side. At least one of the surfaces S4, S5 is made aspheric. The second lens element 20 is provided for correcting chromatic aberration and off-axis aberration. The second lens element 20 has a focusing power within a wide range, which means the focusing power of the second lens element 20 has only little influence to the lens system.

The third lens element 30 is a negative lens having a first surface S6 facing the object side and an opposite second surface S7 on the image side. At least one of the surfaces S6, S7 is made aspheric. The third lens element 30 is provided for correcting off-axis aberration, such as astigmatism or distortion. In the third lens element 30, the focus of an near-axis area is negative and is gradually increased from a negative value to a positive corresponding to increase of distance from the optic axis (namely from the near-axis areas to an edge portion of the third lens element 30). The focus of the edge portion of the third lens element 30 is positive, eventually.

To achieve a short overall length, low tolerance sensitivity and high resolution lens system, the compact imaging lens system according to the present invention satisfy the following conditions:

$$0.2 < f1/F < 1.2 \quad (1)$$

$$|R5-R4|/F < 0.3 \quad (2)$$

where, in expression (1), f1 represents the focal length of the first lens elements 10, and F represents the effective focal length of the lens system. When the ratio f1/F is at or beyond the upper limit (namely 1.2), the overall length of the lens system gets to large, and this does not satisfy the requirement of being small size. When the ratio is at or below the lower limit, the first lens element 10 takes almost all the focusing power for the lens system. This makes the lens system too sensitive and also the edge of the first lens element 10 will get very thin, leading to difficult in manufacturing.

In expression (2), R4 represents radius of curvature of the first surface S4 of the second lens element 20, and R5 represents radius of curvature of the second surface S5 of the second lens element 20. When the ratio of the absolute value of the difference between R5 and R4 to the effective focal length of the lens system is at or beyond the upper limit, it becomes more difficult to correct off-axis aberrations.

The compact imaging lens system according to the present invention has a large wide angle of field (about 60 degrees) and a big aperture diameter (that is F number, about 1:2.8). It also has the character of low manufacture sensitive and low cost. Furthermore, the first, second and third lens element all can be the lens that made of plastics, thereby, the cost and weight of the lens system will be further reduced.

At least one surface of each of the first, second and third lens elements 10, 20, 30 is aspheric. The aspheric surfaces are expressed by the following equation:

$$z = \frac{ch^2}{1 + \sqrt{1-(k+1)c^2h^2}} + Ah^4 + Bh^6 + Ch^8 + Dh^{10} + Eh^{12} + Fh^{14} + Gh^{16}$$

where z is sag value along the optic axis; c is the base curvature (1/radius) of the surface; h is the semi-diameter height; k is the conic coefficient; and A, B, C, D, E, F and G are the 4th-order, 6th-order, 8th-order, 10th-order, 12th-order, 14th-order and 16th-order aspheric coefficients, respectively.

The present invention will be more fully understood by describing two numerical embodiments as follows.

The numerical data of Numerical Embodiments 1 and 2 will be shown below. In each numerical embodiment, the numerical data indicate the relative parameters of the surfaces S1 and S2 of the first lens element, the surface S3 of the aperture, the surfaces S4 and S5 of the second lens element, the surfaces S6 and S7 of the third lens element and the surface S8 of the cover glass 40. The parameters include radius of curvature, thickness, refractive index (Nd) and Abbe number (Vd) for d-line.

| Numerical Embodiment 1 | | | | |
|---|---|---|---|---|
| Surface | Radius (mm) | Thickness (mm) | Nd | Vd |
| S1 | 0.9359 | 0.675 | 1.5146 | 56.96 |
| S2 | 3.4193 | 0.153 | | |
| S3 | Infinite | 0.434 | | |
| S4 | −0.7151 | 0.645 | 1.5854 | 29.9 |
| S5 | −0.9679 | 0.105 | | |
| S6 | −6.1301 | 0.842 | 1.5146 | 56.96 |
| S7 | 13.9067 | 0.707 | | |
| S8 | Infinite | 0.5 | 1.5168 | 64.2 |

In Numerical Embodiment 1, both surfaces (S1, S2) of the first lens element 10 and both surfaces (S4, S5) of the second lens elements 20 are all aspheric. For the third lens element 30, only the second surface S7 is aspheric. Aspheric coefficients for the aspheric surfaces of the first, second, and third lens elements 10, 20, 30 are listed below:

| Surface | Coef. | | | | | | | |
|---|---|---|---|---|---|---|---|---|
| | K | A | B | C | D | E | F | G |
| S1 | −2.808703 | 0.394320 | −0.197298 | 0.311366 | −0.465009 | −0.047823 | 0 | 0 |
| S2 | 15.762875 | −0.170336 | −0.491191 | 0.531893 | 0 | 0 | 0 | 0 |
| S4 | 0.879081 | 0 | 0 | 0 | 0 | 0 | 0 | 0 |
| S5 | −0.147239 | 0.104437 | −0.075964 | 0.483990 | −0.700089 | 0.479362 | 0 | 0 |
| S7 | 15.582802 | −0.114284 | 0.030517 | −0.010593 | −0.002220 | 0.002440 | −0.000501 | 0 |

In this numerical embodiment, the values of the effective focal length of the lens system (F), the relative aperture diameter (F-number), the total length of the lens system (TT), the ratios of expressions (1) and (2) given above are listed in the following table.

| Effective focal length (F) | 3.653 mm |
|---|---|
| F-number | 2.88 |
| total length of the lens system (TT) | 4.06 mm |
| fl | 2.292 |
| fl/F | 0.627 |
| |R5−R4|/F | 0.069 |

Figure 2A:
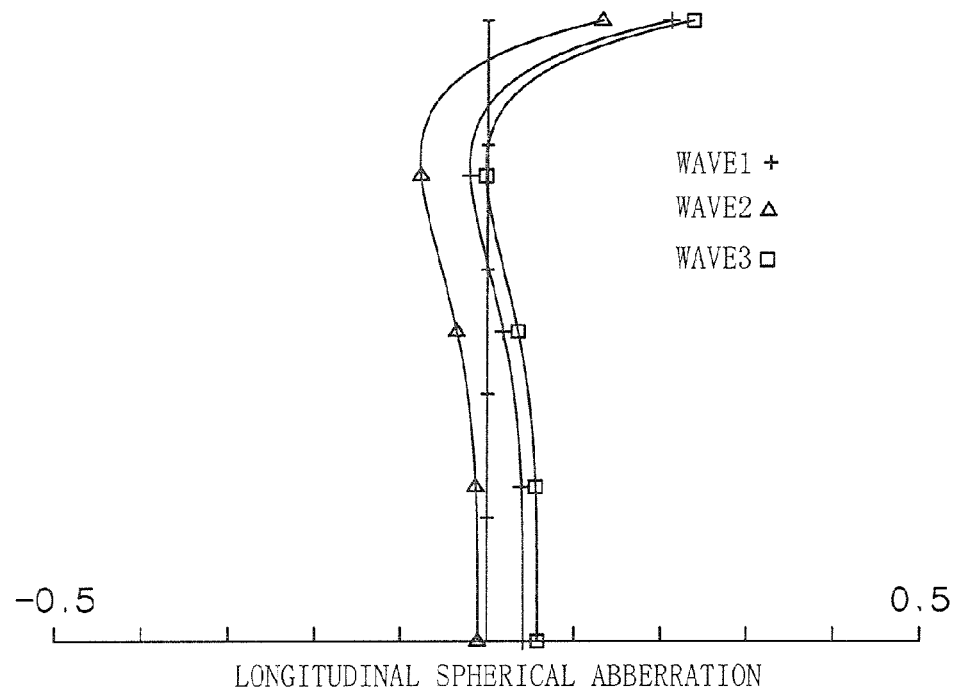
FIG. 2A shows a plot of longitudinal spherical aberration of Numerical Embodiment 1 of the present invention.
Figure 2B:
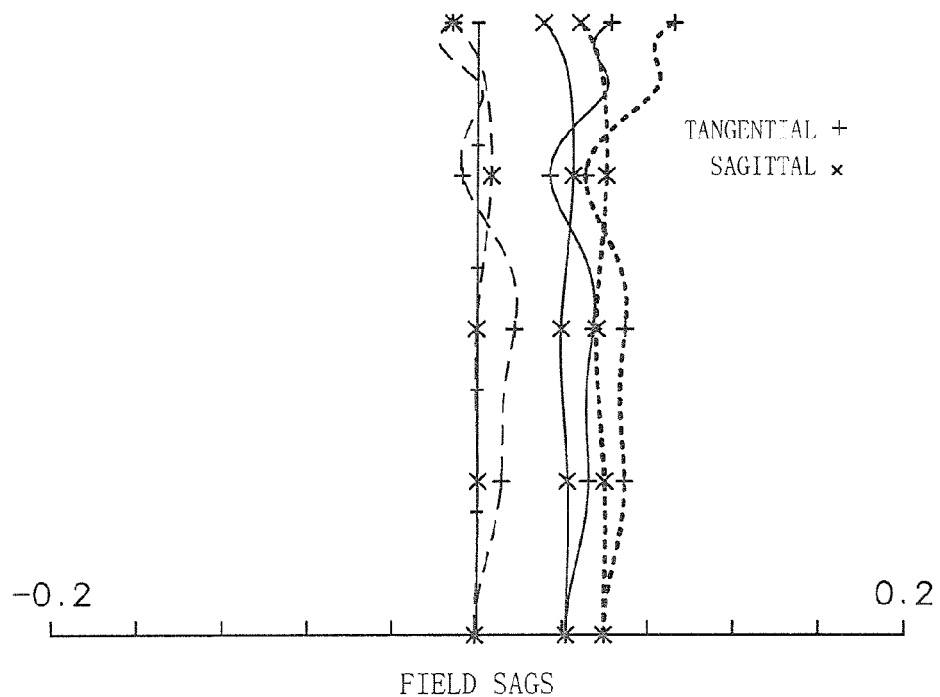
FIG. 2B shows a plot of field curvature of Numerical Embodiment 1 of the present invention.
Figure 2C:
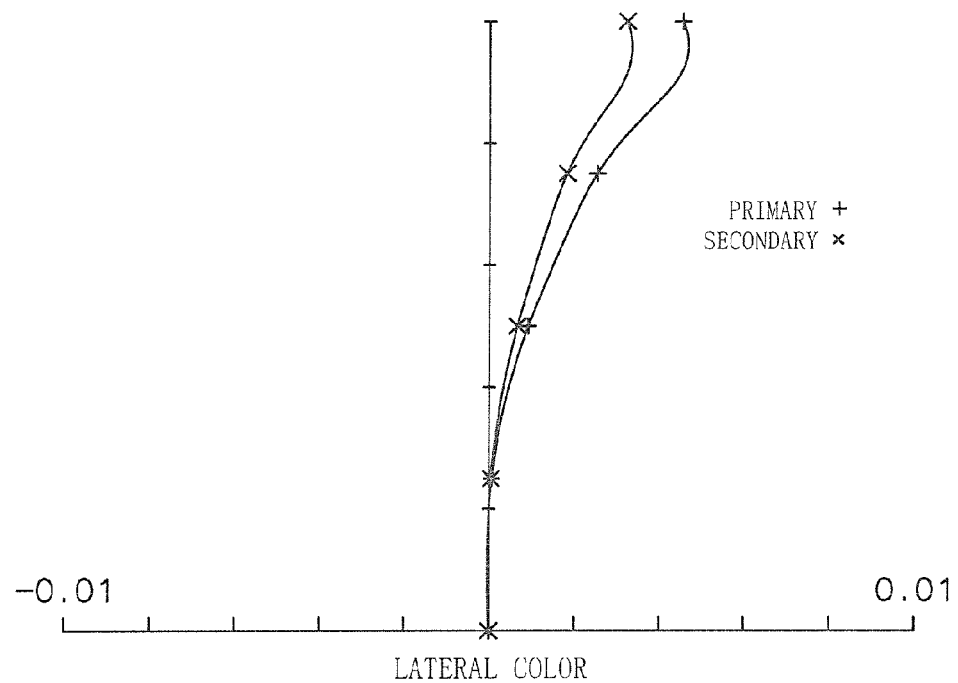
FIG. 2C shows a plot of lateral color aberration of Numerical Embodiment 1 of the present invention.

It can be seen from the above table that the ratio fl/F is 0.627 and the ratio |R5−R4|/F is 0.069. They both satisfy expressions (1) and (2). FIG. 2A shows a plot of longitudinal spherical aberration of Numerical Embodiment 1. FIG. 2B shows a plot of field curvature of Numerical Embodiment 1. FIG. 2C shows a plot of lateral color aberration of Numerical Embodiment 1 of the present invention. From these plots, it can be seen that the compact imaging lens system of Numerical Embodiment 1 in accordance with the present invention provides a high level of optical performance.

| Numerical Embodiment 2 | | | | |
|---|---|---|---|---|
| Surface | Radius (mm) | Thickness (mm) | Nd | Vd |
| S1 | 0.9337 | 0.726 | 1.5146 | 56.96 |
| S2 | 2.7597 | 0.133 | | |
| S3 | Infinite | 0.421 | | |
| S4 | −0.7385 | 0.59 | 1.5146 | 56.96 |
| S5 | −0.9967 | 0.1 | | |
| S6 | −8.9344 | 0.907 | 1.5146 | 56.96 |
| S7 | 14.95 | 0.68 | | |
| S8 | Infinite | 0.5 | 1.5168 | 64.17 |

In Numerical Embodiment 2, all the surfaces (S1, S2, S4, S5, S6, S7) of the first, second and third lens elements 10, 20, 30 are aspheric. Aspheric coefficients for the aspheric surfaces are illustrated below:

In this numerical embodiment, the values of the effective focal length of the lens system (F), the relative aperture diameter (F-number), the total length of the lens system (TT), the ratios of the expressions (1) and (2) given above are listed in the following table.

| Effective focal length (F) | 3.642 mm |
|---|---|
| F-number | 2.88 |
| total length of the lens system (TT) | 4.08 mm |
| fl | 2.416 |
| fl/F | 0.663 |
| |R5−R4|/F | 0.071 |

Figure 3A:
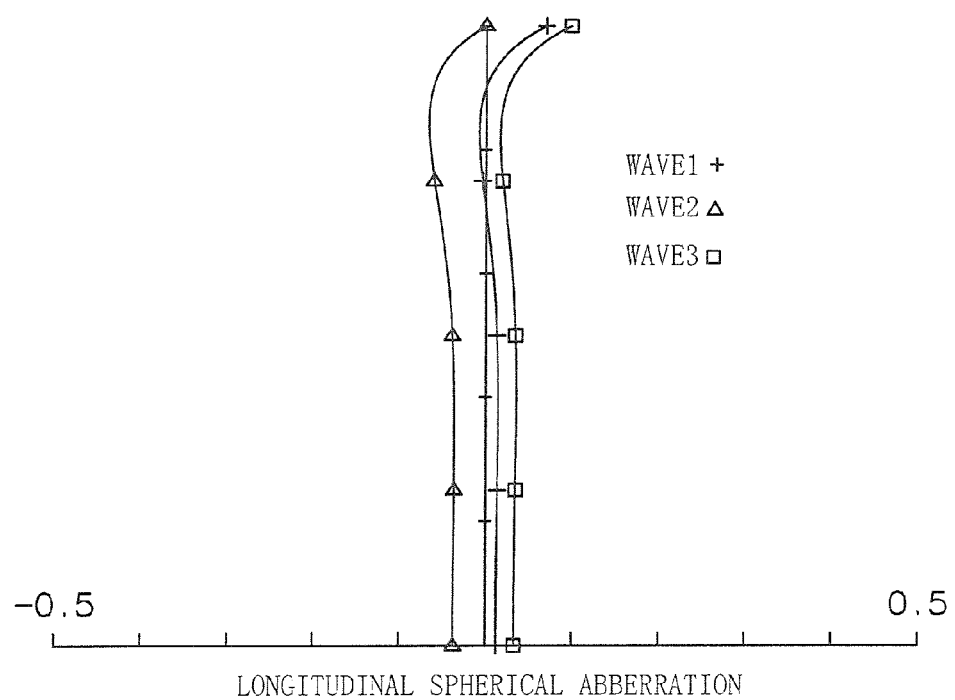
FIG. 3A shows a plot of longitudinal spherical aberration of Numerical Embodiment 2 of the present invention.
Figure 3B:
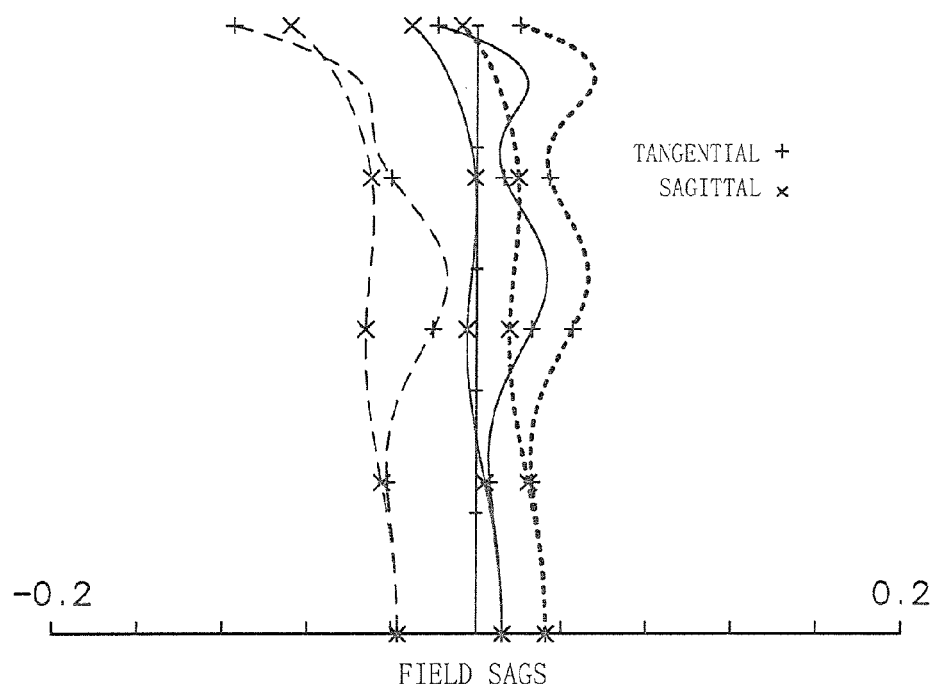
FIG. 3B shows a plot of field curvature of Numerical Embodiment 2 of the present invention.
Figure 3C:
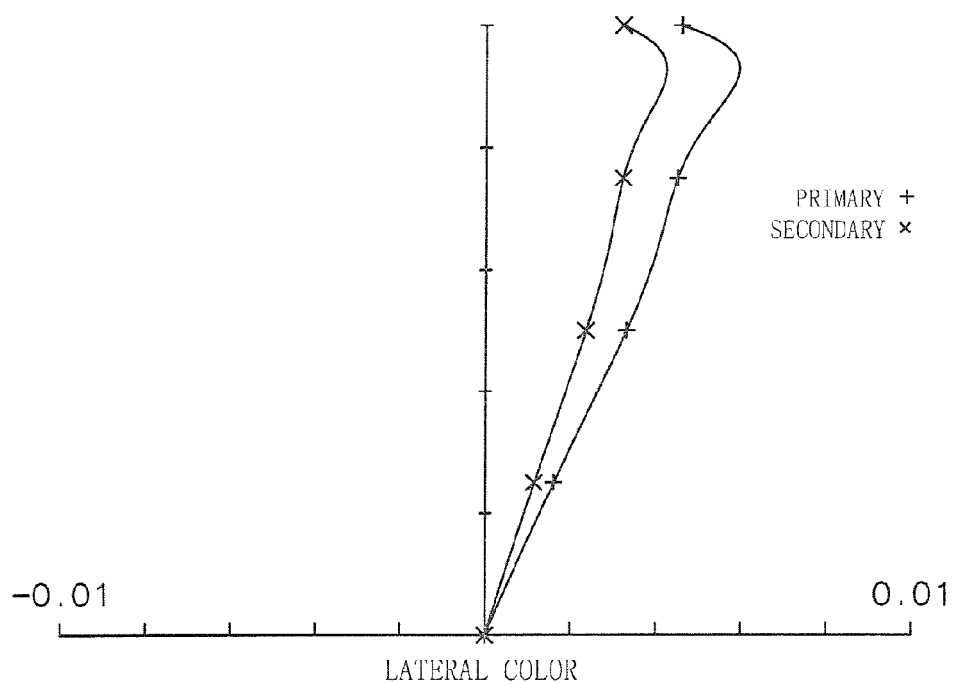
FIG. 3C shows a plot of lateral color aberration of Numerical Embodiment 2 of the present invention.

It can be seen from the above table that the ratio fl/F is 0.663 and |R5−R4|/F is 0.071. They both satisfy the expressions (1) and (2). FIG. 3A shows a plot of longitudinal spherical aberration of Numerical Embodiment 2. FIG. 3B shows a plot of field curvature of Numerical Embodiment 2. FIG. 3C shows a plot of lateral color aberration of Numerical Embodiment 2 of the present invention. From these plots, it can be seen that the compact imaging lens system of Numerical Embodiment 2 in accordance with the present invention provides a high level of optical performance.

The compact imaging lens system of the present invention adopts three lens elements 10, 20, 30. The first lens element 10 is a positive meniscus lens having a convex side facing toward the image side, which has a big focusing power and which is provided to capture image and for balance of aberration. It makes the lens system a low sensitivity lens system. The second lens element 20 is a negative lens and is provided mainly for correcting chromatic aberration and off-axis aberration. The aperture S is set between the first lens element 10 and the second lens element 20, and this is of benefit to balance of aberration. The third lens element 30 is a negative lens and is provided for correcting off axis aberration. Furthermore, the imaging lens system of the present invention consists of only three component lenses that all may be made of plastics. This facilitates cost reduction, weight reduction, while still maintains a high resolution.

It is to be understood, however, that even though numerous characteristics and advantages of the present invention have

| Surface | Coef. | | | | | | | |
|---|---|---|---|---|---|---|---|---|
| | K | A | B | C | D | E | F | G |
| S1 | −2.716889 | 0.405953 | −0.188334 | 0.397581 | −0.316209 | 0.026571 | 0 | 0 |
| S2 | 16.325236 | −0.085681 | −0.582083 | 0.147439 | 0 | 0 | 0 | 0 |
| S4 | 0.738850 | 0.068129 | −1.863102 | 15.080392 | −47.161189 | 0 | 0 | 0 |
| S5 | 17.712992 | −0.003459 | 0.037883 | −0.02289 | −0.000912 | 0 | 0 | 0 |
| S6 | −0.246528 | 0.068129 | −1.863102 | 15.080392 | −47.161189 | 0 | 0 | 0 |
| S7 | −50.613236 | −0.108108 | 0.027554 | −0.010052 | −0.002145 | 0.002452 | −0.000495 | 0 |

What is claimed is:

1. A compact imaging lens system comprising, from an object side to an image side, a first positive lens element, an aperture, a second negative lens element, and a third negative lens element, wherein the first and second and third lens elements are aspheric lenses each having at least one aspheric surface; wherein the third lens element has a near-axis area and an edge portion extending from the near-axis area in a direction away from an optic axis of the lens system, the third lens element having a focus that is of a negative value in the near-axis area and gradually increases from the negative values toward a positive value at the edge portion; and wherein the compact imaging lens system satisfies the condition: $0.2<f1/F<1.2$, where f1 is focal length of the first lens element and F represents an effective focal length of the lens system.

2. The compact imaging lens system as claimed in claim 1, wherein the lens system further satisfies the condition: $|R5-R4|/F<0.3$, where R4 is radius of curvature radius of an object-side surface of the second lens element, R5 represents radius of curvature of an image-side surface of the second lens element, and F represents an effective focal length of the lens system.

3. The compact imaging lens system as claimed in claim 1, wherein the first, second and third lens elements are all made of plastics.

4. The compact imaging lens system as claimed in claim 1, wherein each of the first, second and third lens elements has opposite aspheric surfaces.

5. The compact imaging lens system as claimed in claim 1, wherein both surfaces of the first and second lens element are aspheric, and wherein the third lens element has an image-side surface that is aspheric.

6. The compact imaging lens system as claimed in claim 1 further comprising an image pickup device set at a position where an image is focused by the compact imaging lens system, the image pickup device having a cover for protecting an image pickup surface of the image pickup device.

7. The compact imaging lens system as claimed in claim 1, wherein the first lens element comprises a positive meniscus lens having a first convex surface facing the object side and an opposite second concave surface on the image side.

8. The compact imaging lens system as claimed in claim 1, wherein the second lens element comprises a negative lens having a first concave surface facing the object side and an opposite second convex surface on the image side.

9. The compact imaging lens system as claimed in claim 1, wherein the focus of the edge portion of the third lens element is positive.

* * * * *